No. 713,552. Patented Nov. 11, 1902.
W. S. BRANDT & F. J. ROOT.
PROCESS OF MAKING WOOD ALCOHOL.
(Application filed June 24, 1901.)
(No Model.)
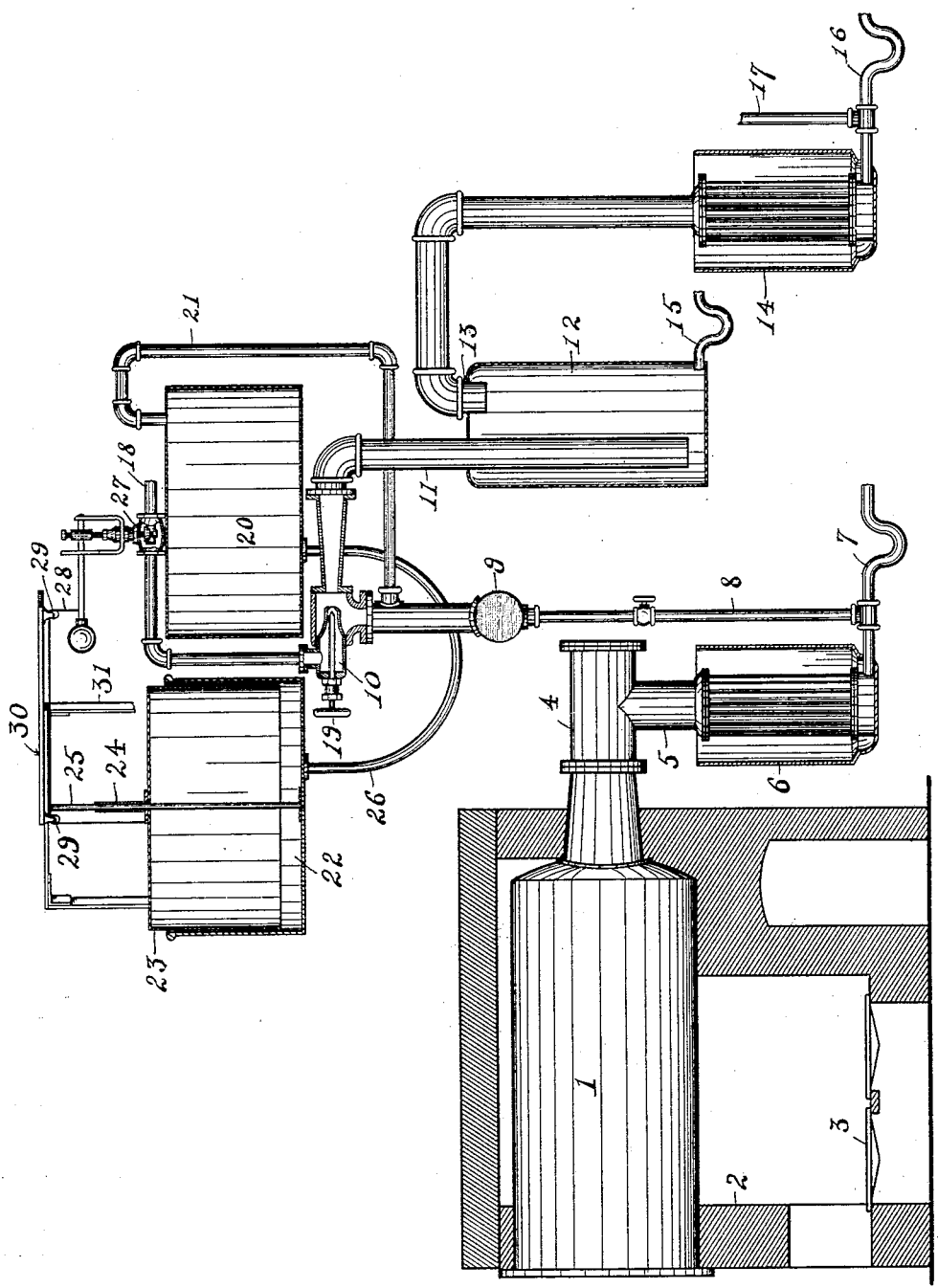
Witnesses:
D. B. Tuttle
Harriet M. Burns.
Winfield Scott Brandt,
Frank Jared Root,
Inventors,
by their Attorneys,
Macomber & Ellis.
THE NORRIS PETERS CO., PHOTO-LITHO., WASHINGTON, D. C.

UNITED STATES PATENT OFFICE.

WINFIELD SCOTT BRANDT AND FRANK JARED ROOT, OF BINGHAMTON, NEW YORK.

PROCESS OF MAKING WOOD-ALCOHOL.

SPECIFICATION forming part of Letters Patent No. 713,552, dated November 11, 1902.

Application filed June 24, 1901. Serial No. 65,755. (No specimens.)

*To all whom it may concern:*

Be it known that we, WINFIELD SCOTT BRANDT and FRANK JARED ROOT, citizens of the United States, residing at Binghamton, New York, have invented certain new and useful Improvements in Processes of Making Wood-Alcohol, of which the following is a full, clear, and exact description.

More particularly, our invention relates to a process for the control and treatment of the vapor products of the destructive distillation of wood in order to obtain the maximum of distillate, and, conversely, to secure a condition involving the minimum of loss of substance by oxidation or other chemical or physical reaction or action and the most complete reduction of the so-called "non-condensable gases."

Our invention will be the more clearly understood from a reference to existing processes and their attendant evils. In the simplest process the wood is destructively distilled in a retort and the gases are forced by their pressure as developed in a closed chamber, through an ordinary condenser. Here three difficulties arise: First, since it is impossible in the processes of commercial production to render the retorts gas-tight quantities of gases are expelled through leaks, which results in loss and danger from fire; second, the pressure developed (and necessary in this case) to drive the gases through the condenser throws the constituent elements of the gases into such physical relation as to produce oxidation and other chemical combination which result in loss of vapor, nor is this difficulty removed by the use of an ordinary pump, fan, or exhaust, for the gas and vapor volume so varies, not only with reference to the beginning and end of a run, but from moment to moment, that there exists either too little reduction of pressure or else so much as to cause the introduction of air and the consequent oxidation of gas or charcoal, or both; third, the gases thus forced through the condenser are largely irreducible and are largely lost as non-condensed gases, because the gases still bear in suspension some tar, alcohol, and acetic acid, which, but for the violent agitation and consequent breaking up and recovery by our process, are lost. This last-mentioned condition was the most serious and gave rise to the next step—namely, the introduction of steam into the gases as they came from the retort to render them further condensable; but this proved inefficient, since the introduction of steam increased the existing overpressure, and, what is more serious, the subjection of the condensable gases to the presence of steam for the purpose of reaching the gases not readily condensed resulted in the material injury of the condensable gases by oxidation, because the steam, brought into the presence of a temperature of about 700° Fahrenheit, releases sufficient oxygen to combine with the acids to materially injure the product. It therefore follows that an efficient process must involve a control of the gas-pressure in the retort which will vary in action directly with the variation of gas production, that the condensable gases must be recovered before steam is injected, and that the gases not readily condensed must be treated after separation from the readily-condensable gases to a volume of steam directly proportional to the constantly-varying volume of such gases produced.

To this end our invention consists of the novel processes carried out by the mechanism hereinafter described; but the novel mechanical features involved, not being a part of our joint invention, are not claimed in this application.

Referring to the drawing herewith, consisting of one sheet, we have therein shown a diagrammatic view in elevation of our invention, the walls of the battery of retorts being shown in section.

The principal parts of the apparatus which we employ in carrying out our process are as follows: 1 is one of a series or battery of retorts of the usual type, mounted within fire-walls 2, with grates 3. From the necks 4 pipes 5 lead to condensers 6, from which the condensed gases are led off through trapped pipes 7, and the gases not readily condensed are carried away by pipes 8 to a main 9. The retort 1 is a typical construction, but any form of retorts may be employed. From the main 9 a pipe leads to a steam-jet exhauster 10, which in turn discharges into the pipe 11, which carries the saturated gases and steam through pipe 11, separator 12, and pipe 13 to secondary condenser 14. The pipe 11 leads to a separator 12. In this device the pipe 11 extends inside the separator-chamber nearly to the bottom. An exit-pipe 13 leads from the top of this chamber to the secondary condenser 14. The condensers 6 are commonly termed "primary" condensers and the condenser 14 the "secondary" condenser, for the reason that the vapors first pass through the condensers 6 and then after treatment, as described, pass through the condenser 14. A trap 15 carries off the distillate from the separator. The utility of this device is not only to provide additional condensing-surface, but to cool the vapors and remove a large portion of the acid, thus reducing to a minimum the wear on the secondary condenser. The pipe 13 leads to a condenser 14, where the gases are further condensed, the liquid product being carried away through the trapped pipe 16, while the non-condensable gases are removed through the pipe 17. It will of course be understood that both the primary and secondary condensers and the separator are properly cooled by any of the well-known means.

Referring especially to the steam-jet exhauster, 18 is a steam-supply pipe provided with a hand-valve 19, which may be opened to give the maximum amount of steam. 20 is a closed tank connected at its top with the gases in the main 9 by piping 21. 22 is an open tank set at the same level with the tank 20 and which carries within it a float, which is guided centrally by a tubular rod 24, which takes over a rod 25, fixed to the tank 22. The bottoms of the tanks 20 and 22 are connected by piping 26. Mounted upon the steam-supply pipe 18 is an ordinary balanced valve 27. A chain or cable 28 connects the float 23 and the arm of the balanced valve 27 by passing over pulleys 29, secured to a bar supported by brackets 31, attached to the tank 22.

Having indicated the parts of the apparatus, the process and method of operation are as follows: The retorts 1 are filled and sealed in the usual manner, and fires capable of producing destructive distillation of the wood are started upon the grates 3. A temperature of about 700° Fahrenheit is required for such distillation. The steam-pipe 18 is given a supply of steam by means of the hand-valve 19; but this valve plays no part in the regulation of the supply of steam. This steam-supply must be controlled automatically and must be determined by the constantly-varying volume and pressure of the gases through automatic means governed by said gases, since if operated by hand the operator could discover such variation only after the secondary condensation had taken place, and consequently after damage to the products had occurred. The tanks 20 and 22 are filled through the tank 22 with sufficient water to half fill each. (It will of course be understood that vent is given to tank 20 in filling, so that the pipe 26 will bring the water to a common level in the two tanks.) The float 23 being in place and the chain 28 properly adjusted, the balanced valve 27 will throttle the supply of steam which passes through the exhauster 10. As soon as the gases are produced by the distillation of the wood in the retorts 1 and the steam is turned on by the hand-valve 19 the tension of the air in the tank 20 is at once brought to that of the gas in the main 9. This is normally less than atmospheric pressure, so that the water in the tank 20 is raised while that in 22 is lowered. This results in the float 23 falling with the water-level, which through the chain 28 further throttles the steam in the balanced valve 27, thus increasing the gas tension in the main 9 and tank 20 through the reduced suction of the exhauster 10, so that the gas tension in the main 9 returns more nearly to that of the atmosphere. The reduction of the gas-pressure in the retorts below atmospheric pressure should be about one-fourth to one-half inch as measured by an ordinary water-gage, such as in common use in all gas-works. This reduction in the gas-pressure is necessary to prevent the evils heretofore stated as occurring in existing processes—namely, leakage and oxidation. Furthermore, the reduction in pressure should not far exceed the limits above indicated, because in such case there will occur an indraft of air through cracks in the retorts and consequent burning of gases therein, and the condensed product from the secondary condenser will be necessarily overdiluted by the excess volume of steam which is condensed. Thus there is established an automatic tension of the gases which responds quickly to any variation of gas-supply or steam-pressure, so that we are able to hold the gas-pressure in the retorts, the piping, the primary condenser, and main whatever the supply of gases or pressure of steam coming to the exhauster at a substantially fixed point below that of the atmosphere. This condition attained, the gases generated in the retort pass readily through the condensers 6 without escape or loss or oxidation or chemical change due to pressure where the condensable gases—those capable of condensation without further treatment—are condensed and recovered through the pipes 7. The then non-condensable gases are drawn into the main 9 and thence mixed with a definite proportion of steam by the exhauster 10 in the pipe 11, and thence these saturated gases thus rendered further condensable are passed through the separator 12, where they are separated and cooled and further condensed, and thence they pass to the secondary condenser 14 through the pipe 13, where the final recovery is made and drawn off through trap 16 and the gases incapable of further reduction are carried away by the pipe 17.

It will thus be seen that we are able to produce and recover the readily-condensable gases under a substantially fixed pressure slightly below atmospheric pressure and wholly free from the presence of added steam, thus avoiding the defects above indicated; that we cause the gas to become self-regulating and to mix the non-condensable gases to a determined proportion of steam; that we accomplish a reduction of the gases not readily condensed by steam treatment and condensation after the readily-condensable gases have been removed, thus avoiding the evils above referred to.

Having thus described our process, what we claim is—

1. The herein-described process of treating pyroligneous products in a gaseous and heated state, consisting of recovering by primary condensation the readily-condensable gases and subjecting the remaining gases not readily condensable while in a heated state to a proper proportion of and admixture with steam, and finally subjecting the admixture to a further or secondary condensation, whereby the gases readily condensable are recovered without oxidation and whereby the gases holding the acids against such condensation are rendered further condensable and the acids recovered by secondary condensation, substantially as and for the purpose set forth.

2. The herein-described process of making wood-alcohol, consisting of subjecting wood to destructive distillation, maintaining upon the gases produced by such distillation a pressure slightly below atmospheric pressure, condensing the readily-condensable gases, and then subjecting the gases not readily condensable to admixture with steam, and finally condensing the admixture, substantially as and for the purposes set forth.

3. The herein-described process of making wood-alcohol, consisting of subjecting wood to destructive distillation, maintaining upon the gases produced by such distillation a pressure slightly below atmospheric pressure, condensing the readily-condensable gases, and then subjecting the gases not readily condensable to a definite volume of steam directly proportional to the varying volume of gas, and finally condensing the admixture of gas and steam, substantially as and for the purposes set forth.

4. The herein-described process of making wood-alcohol, consisting of subjecting wood to destructive distillation, immediately condensing the readily-condensable gases, and then subjecting the gases not readily condensable to an admixture with steam, and finally condensing and recovering the acid freed by the action of the steam, substantially as and for the purposes set forth.

5. The herein-described process of making wood-alcohol, consisting of subjecting wood to destructive distillation, maintaining upon the gases produced by such distillation a pressure slightly below atmospheric pressure, immediately condensing the readily-condensable gases, then subjecting the gases not readily condensed to an admixture with steam, and finally condensing and recovering the acid freed by the action of the steam, substantially as and for the purposes set forth.

6. The herein-described process of making wood-alcohol, consisting of subjecting wood to destructive distillation, maintaining upon the gases produced by such distillation a pressure slightly below atmospheric pressure, immediately condensing the readily-condensable gases, then subjecting the gases not readily condensed to an admixture of steam, scrubbing the admixture, and finally condensing and recovering the acid freed by the action of the steam, substantially as and for the purposes set forth.

7. The herein-described process of making wood-alcohol, consisting of subjecting wood to destructive distillation, maintaining upon the gases so produced a substantially fixed pressure slightly less than that of the atmosphere by means of a steam-exhaust acting directly upon the gases not readily condensed and regulated by the tension of such gases, recovering the gases readily condensed in primary condensers, subjecting the gases not readily condensed to a definite proportion of steam, such proportion being regulated by the tension of said gases, and recovering the acids freed by the steam in a secondary condenser, substantially as and for the purposes set forth.

In witness whereof we have hereunto set our hands, in the presence of two witnesses, this 19th day of June, 1901.

WINFIELD SCOTT BRANDT.
FRANK JARED ROOT.

Witnesses:
H. C. COLLIER,
M. E. FINLEY.